(12) United States Patent
Bossen et al.

(10) Patent No.: US 6,516,429 B1
(45) Date of Patent: Feb. 4, 2003

(54) METHOD AND APPARATUS FOR RUN-TIME DECONFIGURATION OF A PROCESSOR IN A SYMMETRICAL MULTI-PROCESSING SYSTEM

(75) Inventors: Douglas Craig Bossen, Austin, TX (US); Alongkorn Kitamorn, Austin, TX (US); Charles Andrew McLaughlin, Round Rock, TX (US); John Thomas O'Quin, II, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/434,767

(22) Filed: Nov. 4, 1999

(51) Int. Cl.[7] .............................................. G06F 11/00
(52) U.S. Cl. ........................................ 714/47; 714/10
(58) Field of Search ........................... 714/47, 10, 48, 714/13, 718, 31, 11

(56) References Cited

U.S. PATENT DOCUMENTS

| | | | | |
|---|---|---|---|---|
| 5,649,090 A | * | 7/1997 | Edwards et al. | 714/10 |
| 5,774,647 A | * | 6/1998 | Raynham et al. | 711/115 |
| 5,815,651 A | * | 9/1998 | Litt | 709/107 |
| 5,862,308 A | * | 1/1999 | Andress et al. | 710/260 |
| 5,914,967 A | * | 6/1999 | Yomtoubian | 714/718 |
| 5,968,182 A | * | 10/1999 | Chen et al. | 714/42 |
| 5,974,576 A | * | 10/1999 | Zhu | 714/704 |
| 6,119,246 A | * | 9/2000 | McLaughlin et al. | 714/15 |
| 6,233,680 B1 | * | 5/2001 | Bossen et al. | 713/1 |
| 6,378,027 B1 | * | 4/2002 | Bealkowski et al. | 709/223 |

* cited by examiner

Primary Examiner—Robert Beausoleil
Assistant Examiner—Yolanda L. Wilson
(74) Attorney, Agent, or Firm—Duke W. Yee; Mark E. McBurney

(57) ABSTRACT

A method and apparatus in a multiprocessor data processing system for managing a plurality of processors. Monitoring for recoverable errors in a set of processors is performed. Responsive to detecting a recoverable error for a processor in the set of processors, a determination is made as to whether the recoverable error indicates a trend towards an unrecoverable error. Responsive to a determination that the recoverable error indicates a trend towards an unrecoverable error, actions are initiated to stop the processor.

48 Claims, 6 Drawing Sheets

FIG. 2A

| BIT FIELD NAME (BIT NUMBER(S)) | DESCRIPTION, VALUES |
|---|---|
| Version (0:7) | A distinct value used to identify the architectural version of message.<br>Current version = (1) |
| Severity (8:10) | Severity level of error/event being reported:<br>FATAL (5)<br>ERROR (4)<br>ERROR_SYNC(3)<br>WARNING (2)<br>EVENT (1)<br>NO_ERROR (0)<br>reserved for future use (6-7) |
| RTAS Disposition (11:12) | Degree of recovery which RTAS has performed prior to return after an error (value is FULLY_RECOVERED if no error is being reported):<br>FULLY_RECOVERED(0)<br>   Noted: Cannot be used when Severity is "Fatal".<br>LIMITED_RECOVERY(1)<br>NOT_RECOVERED(2)<br>reserved for future use (3) |
| Optional_Part_Presence (13) | Indicates if an Extended Error Log follows this 32-bit quantity in memory:<br>PRESENT (1): The optional Extended Error Log is present.<br>NOT_PRESENT (0): The optional Extended Error Log is not present. |
| Reserved (14:15) | Reserved for future use (0:3) |
| Intiator (16:19) | Abstract entitiy that initiated the event or the failed operation:<br>UNKNOWN (0): Unknown or Not Applicable<br>CPU (1): A CPU failure (in an MP system, the specific CPU is not differentiated here)<br>PCI (2): PCI host bridge or PCI device<br>ISA (3): ISA bus bridge or ISA device<br>MEMORY (4): Memory subsystem, including any caches<br>POWER_MANAGEMENT (5): Power Management subsystem<br>Reserved for future use (6-15) |
| Target (20:23) | Abstract entity that was apparent target of failed operation (UNKNOWN if Not Applicable):<br>Same values as Initiator field |
| Type (24:31) | General event or error type being reported:<br>Internal errors:<br>  RETRY (1): too many tries failed, and a retry count expired<br>  TCE_ERR (2): range or access type error in an access through a TCE<br>  INTERN_DEV_FAIL (3): some RTAS-abstraced device has failed (for example, TODC)<br>  TIMEOUT (4): intended target did not respond before a time-out occurred<br>  DATA_PARITY (5): Parity error on data<br>  ADDR_INVALID (8): access to reserved or undefined address, or access of an unacceptable type for and address<br>  ECC_UNCORR (9): uncorrectable ECC error<br>  ECC_CORR (10): corrected ECC error<br>  RESERVED (11-63): Reserved for future use<br>Environmental and Power Warnings:<br>  EPOW(64): See Extended Error Log for sensor value<br>  RESERVED (65-95): Reserved for future use<br>Power Management Events (96-159): power management event occured - see base CHRP document for details.<br>Reserved for future use (160-223)<br>Vendor-specific events (224-255): Non-orchitected<br>Other (0): none of the above |
| Extended Error Log Length (32:63) | Length in bytes of Extended Error Log Information which follows (see 1.3, "Extended Error Log Format." on page 5) |

Error Return Format (Fixed Part)

| BYTE | BIT(S) | DESCRIPTION |
|---|---|---|
| 0 | 0 | 1 - Log Valid |
| | 1 | 1 = Unrecoverable Error |
| | 2 | 1 = Recoverable (correctable or successfully retried) Error |
| | 3 | 1 = Unrecoverable Error, Bypassed - Degraded operation (for example, Single CPU taken off-line, bad cache bypassed) |
| | 4 | 1 = Predictive Error - Error is recoverable, but indicates a trend toward unrecoverable failure (for example, correctable ECC error threshold) |
| | 5 | 1 = "New" Log (always 1 for data returned from RTAS) |
| | 6 | Always - 1 on RPA implementations indicating Big-Endian |
| | 7 | Reserved |
| 1 | 0 | 1 = A platform specific special error signature has been detected. Bits 4:7 contain an encoded value assigned to this special error signature for this platform |
| | 1:3 | Reserved |
| | 4:7 | Platform-specific value (0x)-0xF) assigned for reporting of unique error signatures, used by diagnostics to generate a product-specific output that can be documented in the product services guide and used by support for special problems |
| 2 | 0 | Set to 1-(Indicates log is in PowerPC format) |
| | 1:2 | Reserved |
| | 3 | 1 = No failing address was available for recording within the log's Detailed Log Data, so the address field is invalid |
| | 4:7 | Log format indicator, defines format used for bytes 12-39:<br><br>(0) Reserved<br>(1) CPU - detected failure, see Table 111 on page 275<br>(2) Memory - detected failure, see Table 112 on page 275<br>(3) I/O - detected failure, see Table 113 on page 277<br>(4) Power-On Self Test (POST) failure, see Table 114 on page 279<br>(5) Environmental and Power Warning, see Table 115 on page 280<br>(6) Power Management Event, see Table 116 on page 280<br>(7-11) Reserved<br><br>(12-15) Vendor-specific detail log, see general form in Table 100 on page 261<br>(12) IBM-specific Diagnostic log, see Table 91 on page 233<br>(13) IBM-specific service processor log, see Table 117 on page 281<br>(14-15) Vendor-specific - Reserved |

GENERAL EXTENDED ERROR LOG FORMAT

*FIG. 2B*

| BYTE | BIT(S) | DESCRIPTION |
|---|---|---|
| 12 | 0 | 1 = CPU internal Error, other than cache; Note: If failure cannot be isolated, these bits may all be 0 |
| | 1 | 1 = CPU internal cache or cache controller error |
| | 2 | 1 = External cache parity or multi-bit ECC error |
| | 3 | 1 = External cache ECC single-bit error |
| | 4 | 1 = System bus time-out error |
| | 5 | 1 = Time-out error, waiting for I/O |
| | 6 | 1 = System bus parity error |
| | 7 | 1 = System bus protocol/transfer error |
| 13 | | Physical CPU ID number |
| 14-15 | | Identifier number of sender of data/address parity error, or element which timed out |
| 16-23 | | 64-bit Memory Address for cache error (High-order bytes = 0 if 32-bit addressing) |
| 24-39 | | Reserved |

ERROR LOG DETAIL FOR CPU-DETECTED FAILURE

*FIG. 2C*

METHOD AND APPARATUS FOR RUN-TIME DECONFIGURATION OF A PROCESSOR IN A SYMMETRICAL MULTI-PROCESSING SYSTEM

CROSS REFERENCE TO RELATED APPLICATIONS

The present invention is related to applications entitled Method and System for Boot-Time Deconfiguration of a Processor in a Symmetrical Multi-Processing System, Ser. No. 09/165,952, filed Oct. 2, 1998; and *Method and Apparatus For Processor Deconfiguration Through Simulated Error Condition In A Multiprocessor System*, Ser. No. 09/299,936 filed Apr. 26, 1999, assigned to the same assignee, and incorporated herein by reference.

BACKGROUND OF THE INVENTION

1. Technical Field

The present invention relates generally to an improved data processing system and in particular to a method and apparatus in a symmetrical multiprocessing system. Still more particularly, the present invention provides a method and apparatus for deconfiguring a processor in a symmetrical multiprocessing system.

2. Description of Related Art

With the need for more and more processing power, symmetrical multiprocessing (SMP) systems are being used more often. SMP is a computer architecture in which multiple processors share the same memory, containing one copy of the operating system, one copy of any applications that are in use, and one copy of the data. SMP reduces transaction time because the operating system divides the workload into tasks and assigns those tasks to whatever processors are free.

SMP systems often times experience failures. Sometimes these failures are so-called hard or solid errors, from which no recovery is possible. A hard error in a SMP system, in general, causes a system failure. Thereafter, the device that has caused the hard error is replaced. On the other hand, a number of failures are repeatable or so-called soft errors, which occur intermittently and randomly. In contrast to a hard error, a soft error, with proper recovery and retry design, can be recovered and prevent a SMP system from failing. Often these soft errors are localized to a particular processor within a SMP system.

A flaw in the semiconductor and computer hardware usually causes an intermittent (soft) error. A flaw degrades over times and becomes a hard or solid error. Therefore, some recoverable soft errors, which are localized or internal to a particular processor within the SMP system, will degrade over time to a hard error and cause a system failure.

Consequently, it would be advantageous to have a method and apparatus for identifying or predicting degradation of a processor in a SMP system and to remove such a processor from the system configuration of the SMP system.

SUMMARY OF THE INVENTION

The present invention provides a method and apparatus in a multiprocessor data processing system for managing a plurality of processors. Monitoring for recoverable errors in a set of processors is performed. Responsive to detecting a recoverable error for a processor in the set of processors, a determination is made as to whether the recoverable error indicates a trend towards an unrecoverable error. Responsive to a determination that the recoverable error indicates a trend towards an unrecoverable error, actions are initiated to stop the processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 2A–2C are diagrams of data found in an error log depicted in accordance with a preferred embodiment of the present invention;

DETAILED DESCRIPTION OF THE PREFERRED EMBODIMENT

Figure 1:
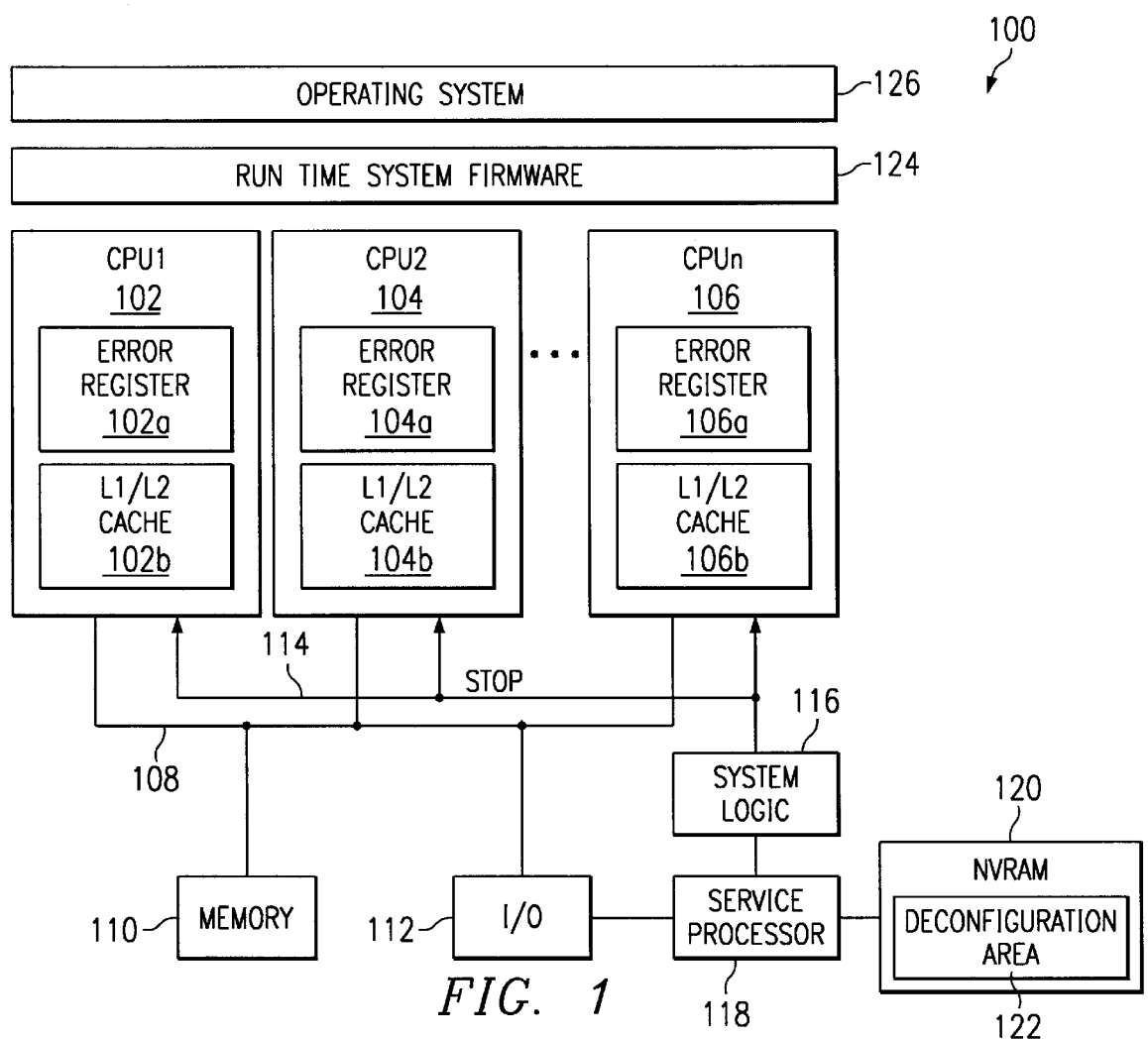
FIG. 1 is a block diagram of a symmetric multiprocessing (SMP) system depicted in accordance with a preferred embodiment of the present invention.

With reference now to the figures and in particular with reference now to FIG. 1, a block diagram of a symmetric multiprocessing (SMP)system is depicted in accordance with a preferred embodiment of the present invention. SMP system 100 is an example of a data processing system in which the present invention may be implemented. SMP system 100 includes central processing units (CPUs) 102, 104, and 106. Although only three CPUs are illustrated in this example, other numbers of CPUs may be used with the present invention. Error registers 102a, 104a, and 106a are located in CPUs 102, 104, and 106, respectively. These registers are used to provide an indication of an error in a processor based on a detection of the error in error logic within the processor.

Bus 108 provides CPUs 102, 104, and 106 a connection to system memory 110 and input/output (I/O) 112. L1/L2 caches 102b, 104b, and 106b contain data used by the CPUs 102, 104, and 106 during processing of instructions. Bus 114 provides CPUs 102, 104, and 106 a connection to system logic 116, which is used to provide a means to put a CPU in a "stop-state". In this way, system logic 116 may isolate a deconfigured CPU from the rest of the functioning system. The service processor 118 is connected to the SMP system via I/O 112 and has access to the system logic 116. Service processor 118 includes firmware for gathering and analyzing status information from each CPU in SMP system 100. Software routines are stored in read-only memory (ROM). Unlike random access memory (RAM), read-only memory stays intact even in the absence of electrical power. Startup routines and low-level input/output instructions are stored in firmware. Nonvolatile random access memory (NVRAM) 120 is a nonvolatile memory device containing system information. In addition, a deconfiguration area 122 is included in NVRAM 120 to store pertinent status information and configuration states of CPUs 102, 104, and 106 received from the run time system firmware or the service processor 118. This status information includes indications of soft errors occurring in CPUs 102, 104, and 106.

SMP system 100 also includes run time system firmware 124. This firmware is also referred to as Run-Time Abstraction Service (RTAS) and provides an abstracted interface between the operating system 126 and the system hardware. Firmware 124 provides a set of hardware specific software functions which an operating system can call to perform a system hardware specific task. This firmware insulates the operating system from writing hardware unique code for the same task. In the depicted examples, operating system 126 is an Advanced Interactive Executive (AIX) operating system, which is available from International Business Machines Corporation.

Whenever an error occurs, the run time system firmware 124 with the assistance from the service processor 118 as required (system implementation specific), analyzes and isolates the error to a specific CPU and report the error to the operating system.

The present invention provides a method, apparatus, and computer implemented instructions for run time deconfiguration of a processor in a SMP system. More specifically, the mechanism of the present invention identifies a degradation of a processor in the system and deconfigures the processor dynamically from the SMP system configuration. As used herein deconfiguring a processor is a process used to stop using and remove the processor from the system. The dynamic deconfiguring means that this process is performed during system run time. This process is used to prevent a failure in the SMP system.

The error analysis performed by run time system firmware 124 or service processor 118 is used to identify soft errors, such as, for example, multiple recoverable or correctable internal CPU or external cache errors, occurring during system run time that exceed a predefined threshold. A CPU having these type of errors is identified as one to be deconfigured. In response to identifying this type of error, the error is reported to operating system 126 via a data structure, such as, for example, an error log.

With reference now to FIGS. 2A–2C, diagrams of data found in an error log are depicted in accordance with a preferred embodiment of the present invention. These figures provide a description of the information sent to operating system 126 when a processor is to be deconfigured. FIG. 2A illustrates the error return format for an error log. Bits 8–10 indicate the severity of the error or event being reported. Bit 13 indicates whether an extended error log is part of the record. Bits 16–19 are used to identify the entity initiating the event or failed operation while bits 20–23 are used to identify the entity that was the target of the failed operation. FIG. 2B shows the error log format for extended error log information in accordance with a preferred embodiment of the present invention. In particular, bit 4 in byte 0 contains an indication of whether the error is a predictive error. In FIG. 2C, details of a CPU detected failure are illustrated. Byte 13 contains the physical CPU ID for a CPU detected failure.

FIGS. 2A–2C are meant to be illustrative of a way information can be sent to dynamically deconfigure a processor and not as a limitation to format of the present invention. When operating system 126 in FIG. 1 receives an error log from run time system firmware 124, operating system 126 will attempt to migrate all resources associated with that processor to another processor. These resources are, for example, processes, tasks, and interrupts. Thereafter, operating system 126 will stop the processor by making a call to the run time system firmware routine called "stop-self RTAS". System firmware 124, with assistance from the service processor as required (hardware implementation dependent), places the CPU in a "stop state".

Figure 3:
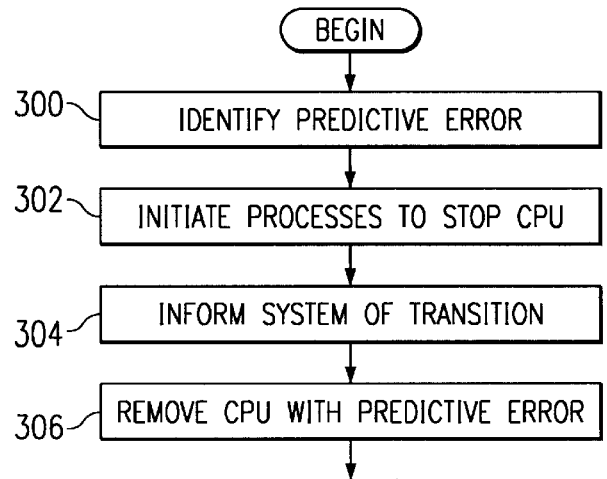
FIG. 3 is a flowchart of a process for run time deconfiguration of a processor in a SMP system depicted in accordance with a preferred embodiment of the present invention.

Turning next to FIG. 3, a flowchart of a process for run time deconfiguration of a processor in a SMP system is depicted in accordance with a preferred embodiment of the present invention. The process illustrated in FIG. 3 may be implemented using run time system firmware 124, service processor 118, system logic 116, and operating system 126 in FIG. 1 in these examples.

The process begins by identifying a predictive error (step 300). A run time error tracking firmware periodically checks, tracks and maintains a record of the recoverable errors, which are localized within a processor. This firmware may be implemented using, for example, run time system firmware 124 or a service processor 118 in FIG. 1. The exact location will depend on a specific system hardware implementation. The firmware utilizes the error detection and capture hardware circuitry within a CPU. When the error record indicates a pattern of soft errors which trending toward a hard error, the firmware marks the error record of this CPU in the deconfiguration are of NVRAM 112 to indicate that this CPU should not be used in the future. Then, this error, a predictive error type, is reported to the operating system with the associated CPU ID.

The operating system then initiates a process to stop the CPU (step 302). When the operating system receives the error log, the operating system will migrate all processes and interrupt handlers off of the CPU identified as having the predictive error. These processes and interrupt handlers are migrated to other CPUs in the system. The operating system will then stop dispatched tasks and interprocessor interrupts to the CPU with the error.

Then, the operating system will send a call to "stop-self" firmware portion of the run time system firmware to stop the CPU. The "stop-self" firmware, which is part of run time system firmware 124, is running in the CPU to be deconfigured. Depending on the specific system hardware implementation, the "stop-self" firmware can put the CPU in "stop-state" by itself, or it may need assistance from the service processor.

Next, the system is informed of the transition (step 304). The stop-self firmware portion of the run time system firmware informs other part of the this system firmware and service processor, that the SMP system is transitioning from N processors to N−1 processors. The run time system firmware and the service processor change their state machines to manage and/or handle the system with N−1 processors. The stop-self firmware, then flushes the local caches (L1 and L2) of the processor with "predictive error" to ensure that all memory data that are stored in and modified by this processor are stored back into memory. The stop-self firmware, with assistance from the service processor as required, places the processor in "stop state" (or a hard reset in some hardware implementation). Once this process is completed, the CPU with the predictive error is removed (step 306), and the SMP system continues to run with N−1 processors.

Thereafter, if the system is shutdown and rebooted, the CPU with the predictive error is removed from the system configuration during the next system boot process The information used to remove the CPU is stored in a nonvolatile memory, such as NVRAM 120 in FIG. 1. This state of the processor is maintained within deconfiguration area 122 in NVRAM 120 in FIG. 1. More information on boot time deconfiguration of a processor is found in United States Patent Application, entitled Method and System for Boot-Time Deconfiguration of a Processor in a Symmetrical Multi-Processing System, Ser. No. 09/165,952, filed Oct. 2, 1998, which is incorporated herein by reference.

Figure 4:
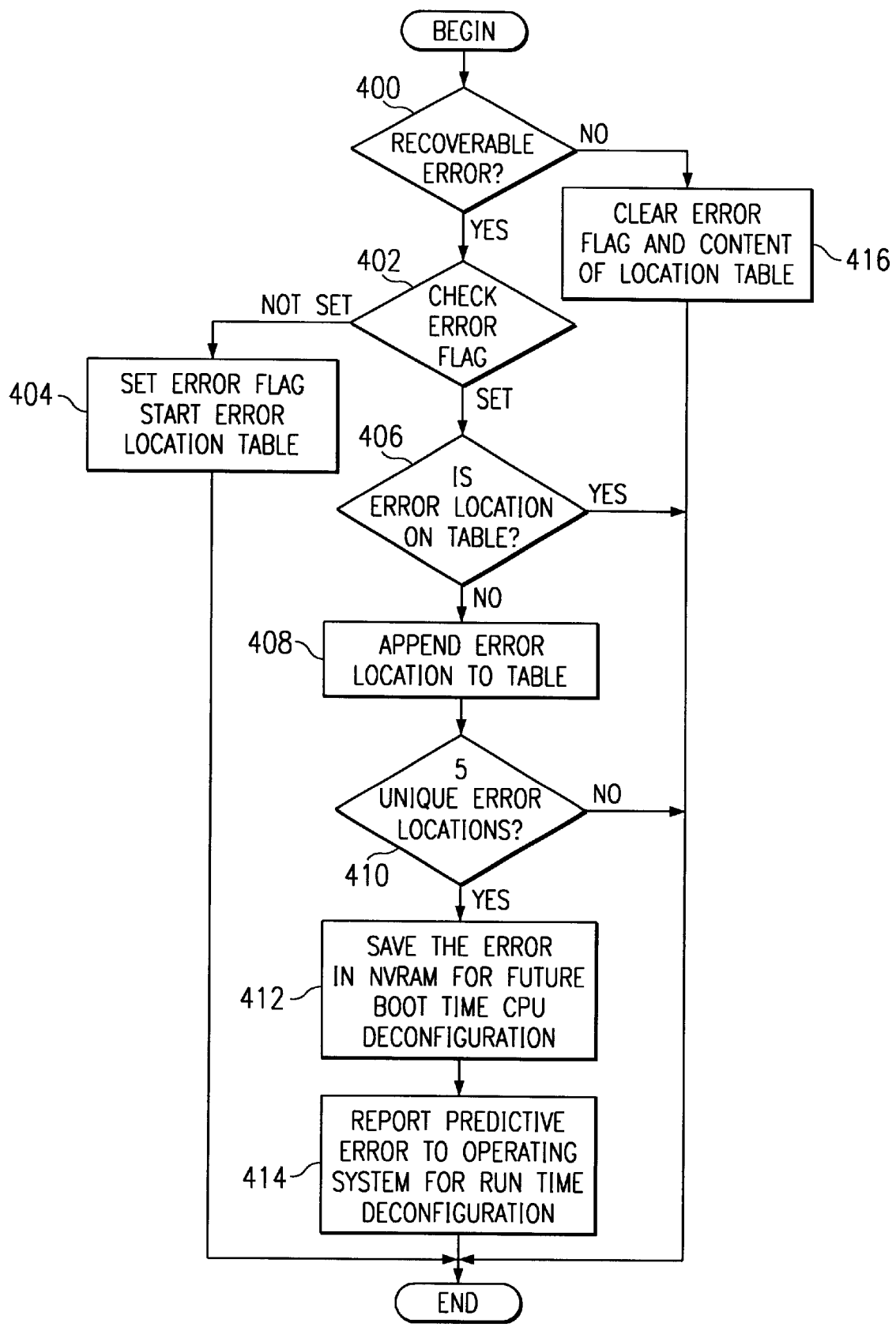
FIG. 4 is a flowchart of a process for predictive error tracking for a CPU depicted in accordance with a preferred embodiment of the present invention.

With reference now to FIG. 4, a flowchart of a process for predictive error tracking for a CPU is depicted in accordance with a preferred embodiment of the present invention. This process is a more detailed description of step 300 in FIG. 3. The process illustrated in FIG. 4 may be implemented in run time system firmware 124 with assistance from a service processor 118, as required in these examples.

The firmware periodically checks CPU error registers in the SMP system. When an error occurs, the process in FIG. 4 is initiated. The process begins with a determination being made as to whether the error is a recoverable error (step 400). If the error is a recoverable error, an error flag is checked to see whether the flag has been set (step 402). If the flag has not been set, the error flag is set and an error location table is started for the CPU (step 404), with the process terminating thereafter. The error location table is used to track unique and multiple soft or recoverable error locations within a specific CPU. The information in this table is used to identify when a threshold has been exceeded and that the CPU is to be dynamically deconfigured.

With reference again to step 402, if the error flag has been set, a determination is made as to whether the error location is on the table (step 406). An error location may be, for example, a unique cache or memory address. A table is used to store these error locations for processing. If the error location for an error is on the table, the error is the same error that was reported during previous check. One cache address with a recoverable error can be accessed repeatedly, thus producing multiple error indications from a single error. Therefore, this process in FIG. 4 can differentiate between a cache with a few error locations from a cache with a large amount of recoverable error locations. If the error location is not on the table, the error location is appended to the table (step 408). Next, a determination is made as to whether five unique error locations are present in the table for the CPU (step 410). This step is used to see whether the errors for the CPU have exceeded a selected threshold, which is in this case five unique error locations. Of course, other numbers of error locations may be used as a threshold depending on the implementation. In addition, other types of mechanisms may be used to predict trends toward hard errors other than error locations. For example, in the alternative, a simple counter used to count number of errors regardless of location may be used in place of error locations, although it is less sophisticated and may prematurely report a predictive trend.

If five unique error locations are present, the error is saved in the deconfiguration area in the NVRAM for future boot time CPU deconfiguration (step 412). In step 412, a deconfiguration record is updated to identify the type of error and the specific CPU. This record is used at a later time when the SMP system is shutdown and then re-booted or re-started up.

Thereafter, the predictive error is reported to the operating system for run time deconfiguration (step 414). In these examples, the predictive error is sent in an error log structure as described above. Information of interest to the operating system include, for example, the severity of the error, the disposition or result of the error, the initiator (identification of the CPU), identification of the error as a predictive error, and identifying the error as a CPU detected error. The process is ended and restarted at the next time period.

With reference again to step 410, if five unique error locations are not present in the table, the process then terminates.

With reference again to step 400, if there is no recoverable error present, the error flag is cleared as well as the content of the location table (step 416) with the process then terminating. If no recoverable error is present during this checking period, the error trend is now broken. The previous error logged in the location table could be caused by a random, non repeating transient (soft) error which are induced by either alpha particle in lead material or cosmic ray. This step is used filter out occasional occurrence of soft error.

The processing illustrated in FIG. 4 is applied to only one error at a time. The firmware will exit the flow after completing processing of one error. If another error exists, this error will be processed during the next time period.

Figure 5:
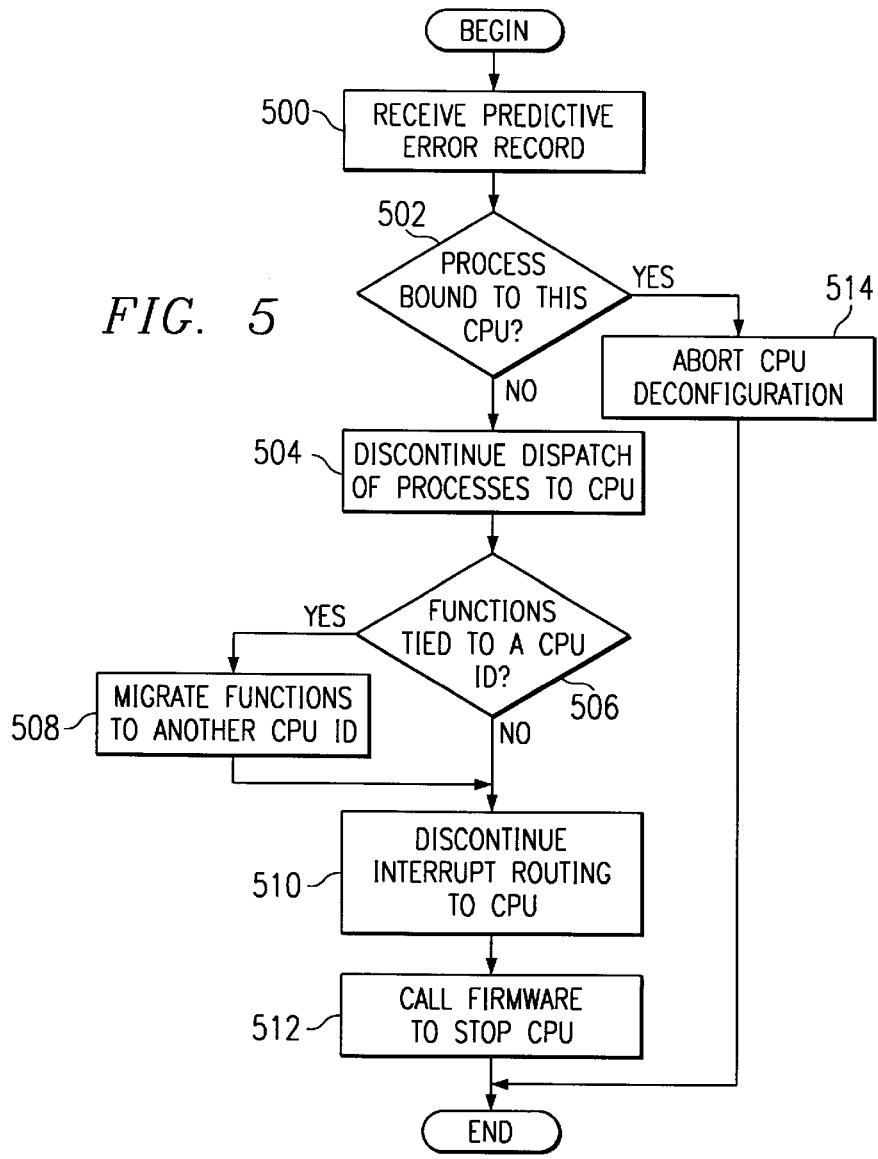
FIG. 5 is a flowchart of a process for dynamically stopping a CPU depicted in accordance with a preferred embodiment of the present invention.

With reference now to FIG. 5, a flowchart of a process for dynamically stopping a CPU is depicted in accordance with a preferred embodiment of the present invention. This flowchart is a more detailed description of step 302 in FIG. 3. The steps in this process may be implemented in an operating system, such as operating system 126 in FIG. 1.

The process begins by receiving a predictive error record (step 500). In these examples, the error record may take the form of an error log as described above. A check is made to determine whether the CPU specified by the error record has one or more operating system processes that are required to be run on that CPU(bound process) (step 502). The AIX operating system used in these examples provides the application with the capability to specify explicitly to run on a logical CPU in the system. The software process with this explicit direction to the AIX OS is called a bound process. If no bound process(es) are present, then dispatch of operating system processes to that CPU are discontinued (step 504). A determination is made as to whether if there are software functions that tie specifically to the CPU ID to be deconfigured. (step 506). If the functions are tied to a CPU ID, then those software functions are migrated to another CPU ID (step 508). Thereafter, interrupt routing to the CPU is discontinued (step 510). Further, the process also proceeds directly to step 510 if no functions are tied to this CPU ID (step 506). Next, a call is made to the "stop-self" run time firmware to stop the CPU (step 512) with the process terminating thereafter.

With reference again to step 502, if the check for a bound process is positive, then the CPU deconfiguration is aborted (step 514) with the process terminating thereafter.

Figure 6:
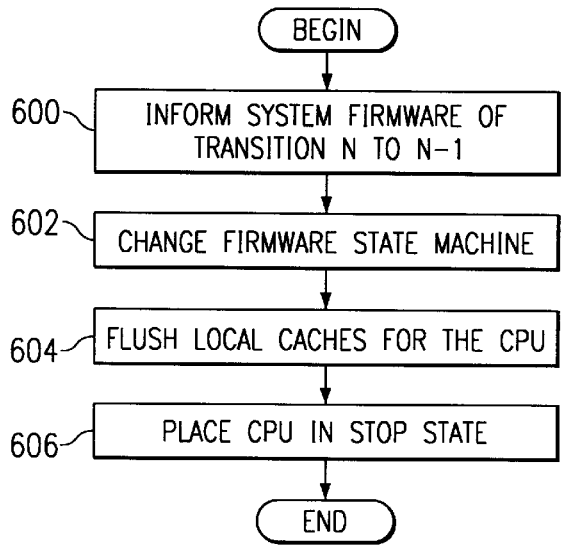
FIG. 6 is a flowchart of a process for stopping a CPU depicted in accordance with a preferred embodiment of the present invention.

With reference now to FIG. 6, a flowchart of a process for stopping a CPU is depicted in accordance with a preferred embodiment of the present invention. The process in this flowchart is a more detailed description of steps 304 and 306 in FIG. 3 and step 512 in FIG. 5.

The process begins by informing system firmware and the service processor that the SMP system is transitioning from N CPUs to N−1 CPUs (step 600). In this example, the "stop-self firmware" will inform other run time system firmware routines and the service processor. Thereafter, the run time firmware and the service processor state machines are changed to manage and/or handle the SMP system with N−1 processors (step 602). The local caches for the CPU being deconfigured are flushed (step 604). These caches are, for example, the L1 and L2 caches for the CPU. This step is performed to insure that all data stored in the cache and modified by the CPU are placed back into memory. The mechanism used to flush the cache is processor implementation dependent.

The CPU is then placed into a stop state (step 606) with the process terminating thereafter. This stop state is in essence hard reset in certain CPU hardware implementations. The mechanism used to place the CPU in a stop or hard reset state may be implemented using known mechanisms and is dependent on the particular CPU.

CPUs that are specifically marked for deconfiguration remain offline in subsequent reboots. This state is maintained in these examples until the faulty CPU is replaced or the CPU is manually reconfigured for use.

Thus, the present invention provides a mechanism for identifying a CPU that has degraded over time and will cause a hard error. The mechanism of the present invention also allows for the identified CPU to be removed during run time. During subsequent reboots, the identified CPU is left out of the SMP system. In this manner, failures from degrading CPUs may be avoided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although the depicted examples illustrate the deconfiguring of CPUs, the processes of the present invention may be applied to other types of processors.

In addition, the various processes may be implemented in other portions of the SMP system other than those in the examples. For example, error tracking may be implemented in the run time system firmware or the service processor. If implemented in the run time system firmware, the run time system firmware will update the "fail status" field in a deconfiguration record to "run time recoverable error threshold exceeded, CPU internal errors" or "run time recoverable error threshold exceeded, external cache errors". If the error tracking is implemented in a service processor, error information is passed to the run time system firmware for error reporting to the operating system with the service processor then updating a deconfiguration record. In this example, the deconfiguration record is located in the NVRAM with the "fail status" field in the deconfiguration record being changed to "run time recoverable error threshold exceeded, CPU internal errors" or "run time recoverable error threshold exceeded, external cache errors".

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a multiprocessor data processing system for managing a plurality of processors, the method comprising:

monitoring for recoverable errors in a set of processors;
responsive to detecting a recoverable error for a processor in the set of processors, determining whether the recoverable error indicates a trend towards an unrecoverable error; and
responsive to a determination that the recoverable error indicates a trend towards an unrecoverable error, initiating actions to stop the processor.

2. The method of claim 1 further comprising:
responsive to detecting a recoverable error for a processor in the set of processors, maintaining a record of the recoverable error.

3. The method of claim 2, wherein the determining step comprises:
determining whether the record indicates a pattern of recoverable errors trending towards a hard error.

4. The method of claim 3, wherein the pattern is a number of errors exceeding a threshold.

5. The method of claim 1, wherein the initiating step includes:
initiating a migration of processes from the processor to other processors in the multiprocessor data processing system.

6. The method of claim 1, wherein the initiating step includes:
initiating a migration of interrupt handlers from the processor to other processors in the multiprocessor data processing system.

7. The method of claim 6, wherein the migration of interrupt handlers are handled by an operating system for the multiprocessor data processing system.

8. The method of claim 1, wherein the initiating step includes:
stopping dispatch tasks on the processor.

9. The method of claim 1, wherein the initiating step includes:
stopping inter-processor interrupts to the processor.

10. The method of claim 1, wherein the initiating step includes:
storing data from a cache used by the processor in a memory.

11. The method of claim 1 further comprising:
maintaining a record of the processor, wherein the processors in the record are left out of the system configuration on a system boot process.

12. The method of claim 1, wherein the monitoring, determining, and initiating steps are located in firmware for the multiprocessor data processing system.

13. A method in a multiprocessor data processing system for managing a plurality of processors, the method comprising:

monitoring the plurality of processors for errors;
responsive to detecting a recoverable error localized to a processor within the plurality of processors, adding the recoverable error to a record of errors for the processor;
responsive to adding the recoverable error to the record, determining whether the record indicates a trend towards an occurrence of an unrecoverable error; and
responsive to determining that the record indicates a trend towards an occurrence of an unrecoverable error, identifying the processor as a processor that should be removed.

14. The method of claim 13 further comprising:
sending the identification of the processor to an operating system for the multiprocessor data processing system to initiate actions to migrate processes away from the processors to other processors within the plurality of processors.

15. The method of claim 13 further comprising:
transitioning the multiprocessor data processing system to manage the plurality of processors minus the processor.

16. The method of claim 15 further comprising:
moving data from a cache used by the processor to a memory in the multiprocessor data processing system.

17. The method of claim 15 further comprising:
removing the processors from a system configuration for the multiprocessor data processing system during a next system boot of the multiprocessor data processing system.

18. The method of claim 13, wherein the multiprocessor data processing system is a symmetrical multiprocessor system.

19. The method of claim 13, wherein the steps of monitoring, adding, determining, and identifying are performed by a run time system firmware and a service processor in the multiprocessor data processing system.

20. A data processing system comprising:
a set of processors;
a run time system firmware; and
a service processor connected to the set of processors, wherein the run time system firmware and the service processor monitor the set of processors for a selected type of fault in which the selected type of fault is an indication of a processor degradation, identify a processor from the set of processors causing the selected type of fault, and dynamically initiate actions to stop the processor in response to detecting the selected type of fault.

21. The data processing system of claim 20, wherein the data processing system is a symmetric multiprocessing system.

22. A data processing system comprising:
a set of processors;
a run time system firmware; and
a service processor connected to the set of processors, wherein the run time system firmware and the service processor monitor the set of processors for a selected type of fault, wherein the selected type of fault is a fault occurring often enough to exceed a threshold in which the selected type of fault is an indication of a processor degradation, identify a processor from the set of processors causing the selected type of fault, and dynamically initiate actions to stop the processor in response to detecting the selected type of fault.

23. A data processing system comprising:
a set of processors;
a run time system firmware; and
a service processor connected to the set of processors, wherein the run time system firmware and the service processor monitor the set of processors for a selected type of fault, wherein the selected type of fault is pattern of soft errors trending towards a hard error in which the selected type of fault is an indication of a processor degradation, identify a processor from the set of processors causing the selected type of fault, and dynamically initiate actions to stop the processor in response to detecting the selected type of fault.

24. A data processing system comprising:
a set of processors;
a run time system firmware; and
a service processor connected to the set of processors, wherein the run time system firmware and the service processor monitor the set of processors for a selected type of fault, wherein the selected type of fault is a soft fault in which the selected type of fault is an indication of a processor degradation, identify a processor from the set of processors causing the selected type of fault, and dynamically initiate actions to stop the processor in response to detecting the selected type of fault.

25. The data processing system of claim 24, wherein the processor is removed from the system configuration during a next system boot of the data processing system.

26. A data processing system comprising:
a set of processors;
an operating system;
a run time system firmware; and
a service processor connected to the set of processors, wherein the run time system firmware and the service processor monitor the set of processors for a selected type of fault in which the selected type of fault is an indication of a processor degradation, identify a processor from the set of processors causing the selected type of fault, and dynamically initiate actions to stop the processor in response to detecting the selected type of fault and wherein the run time system firmware initiates actions to stop the processor by sending an error report to the operating system and wherein the operating system migrates processes off of the processor.

27. A data processing system comprising:
a set of processors;
a run time system firmware; and
a service processor connected to the set of processors, wherein the run time system firmware and the service processor monitor the set of processors for a selected type of fault in which the selected type of fault is an indication of a processor degradation, identify a processor from the set of processors causing the selected type of fault, and dynamically initiate actions to stop the processor in response to detecting the selected type of fault, wherein the data processing system includes a system configuration to handle the set of processors and wherein the run time system firmware and the service processor initiates actions to change the system configuration to handle the set of processors minus the processor being stopped.

28. A data processing system for managing a plurality of processors, the data processing system comprising:
monitoring means for monitoring for recoverable errors in a set of processors;
determining means, responsive to detecting a recoverable error for a processor in the set of processors, for determining whether the recoverable error indicates a trend towards an unrecoverable error; and
initiating means, responsive to a determination that the recoverable error indicates a trend towards an unrecoverable error, for initiating actions to stop the processor.

29. The data processing system of claim 28 further comprising:
maintaining means, responsive to detecting a recoverable error for a processor in the set of processors, for maintaining a record of the recoverable error.

30. The data processing system of claim 29, wherein the means of determining comprises:
determining means for determining whether the record indicates a pattern of recoverable errors trending towards a hard error.

31. The data processing system of claim 30, wherein the pattern is a frequency of errors exceeding a threshold within a predefine time period.

32. The data processing system of claim 28, wherein the means for initiating includes:

initiating means for initiating a migration of processes from the processor to other processors in the multiprocessor data processing system.

33. The data processing system of claim 28, wherein the means for initiating includes:

initiating means for initiating a migration of interrupt handlers from the processor to other processors in the multiprocessor data processing system.

34. The data processing system of claim 33, wherein the migration of interrupt handlers are handled by an operating system for the multiprocessor data processing system.

35. The data processing system of claim 28, wherein the means for initiating includes:

stopping means for stopping dispatch tasks on the processor.

36. The data processing system of claim 28, wherein the means for initiating includes:

stopping means for stopping inter-processor interrupts to the processor.

37. The data processing system of claim 28, wherein the means for initiating includes:

storing means for storing data from a cache used by the processor in a memory.

38. The data processing system of claim 28 further comprising:

maintaining means for maintaining a record of the processor, wherein the processors in the record are left out of the system configuration on a system boot process.

39. The data processing system of claim 28, wherein the monitoring means, determining means, and initiating means are located in firmware for the multiprocessor data processing system.

40. A data processing system for managing a plurality of processors, the data processing system comprising:

monitoring means for monitoring the plurality of processors for errors;

adding means, responsive to detecting a recoverable error localized to a processor within the plurality of processors, for adding the recoverable error to a record of errors for the processor;

determining means, responsive to adding the recoverable error to the record, for determining whether the record indicates a trend towards an occurrence of an unrecoverable error; and identifying means, responsive to determining that the record indicates a trend towards an occurrence of an unrecoverable error, for identifying the processor as a processor that should be removed.

41. The data processing system of claim 40 further comprising:

sending means for sending the identification of the processor to an operating system for the multiprocessor data processing system to initiate actions to migrate processes away from the processors to other processors within the plurality of processors.

42. The data processing system of claim 40 further comprising:

transitioning means for transitioning the multiprocessor data processing system to manage the plurality of processors minus the processor.

43. The data processing system of claim 42 further comprising:

moving means for moving data from a cache used by the processor to a memory in the multiprocessor data processing system.

44. The data processing system of claim 42 further comprising:

removing means for removing the processors from a system configuration for the multiprocessor data processing system during a next system boot of the multiprocessor data processing system.

45. The data processing system of claim 40, wherein the multiprocessor data processing system is a symmetrical multiprocessor system.

46. The data processing system of claim 40, wherein the monitoring means, adding means, determining means, and identifying means are located in a run time system firmware and a service processor in the multiprocessor data processing system.

47. A computer program product in a computer readable medium for managing a plurality of processors, the computer program product comprising:

first instructions for monitoring for recoverable errors in a set of processors;

second instructions, responsive to detecting a recoverable error for a processor in the set of processors, for determining whether the recoverable error indicates a trend towards an unrecoverable error; and third instructions, responsive to a determination that the recoverable error indicates a trend towards an unrecoverable error, for initiating actions to stop the processor.

48. A computer program product in a computer readable medium for managing a plurality of processors, the computer program product comprising:

first instructions for monitoring the plurality of processors for errors;

second instructions, responsive to detecting a recoverable error localized to a processor within the plurality of processors, for adding the recoverable error to a record of errors for the processor;

third instructions, responsive to adding the recoverable error to the record, for determining whether the record indicates a trend towards an occurrence of an unrecoverable error; and fourth instructions, responsive to determining that the record indicates a trend towards an occurrence of an unrecoverable error, for identifying the processor as a processor that should be removed.

* * * * *